W. R. NELSON.
CATTLE STANCHION.
APPLICATION FILED APR. 16, 1914.
1,134,150.
Patented Apr. 6, 1915.
2 SHEETS—SHEET 1.
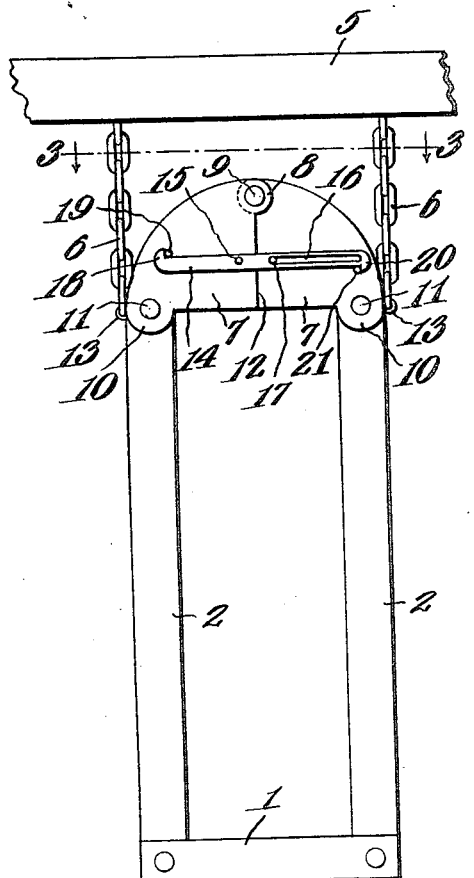
Fig. 1.
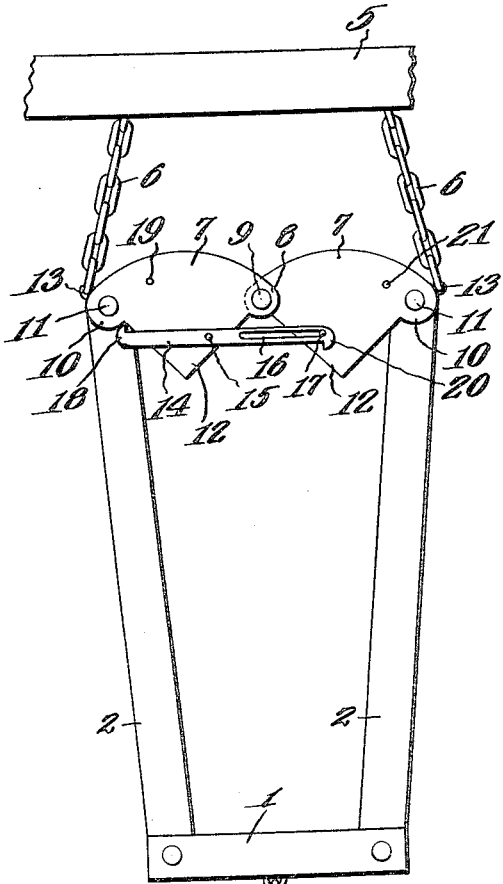
Fig. 2.
Fig. 3.
Witnesses
W. R. Nelson, Inventor
by
Attorneys

W. R. NELSON.
CATTLE STANCHION.
APPLICATION FILED APR. 16, 1914.

1,134,150.

Patented Apr. 6, 1915.
2 SHEETS—SHEET 2.

Witnesses

W. R. Nelson,
Inventor by C. A. Snow & Co.
Attorneys

UNITED STATES PATENT OFFICE.

WALTER R. NELSON, OF MILL VILLAGE, NEW HAMPSHIRE.

CATTLE-STANCHION.

1,134,150.   Specification of Letters Patent.   Patented Apr. 6, 1915.

Application filed April 16, 1914. Serial No. 832,347.

*To all whom it may concern:*

Be it known that I, WALTER R. NELSON, a citizen of the United States, residing at Mill Village, in the county of Sullivan and State of New Hampshire, have invented a new and useful Cattle-Stanchion, of which the following is a specification.

The present invention appertains to a cattle stanchion, and aims to provide a novel and improved structure of that character.

It is the object of the present invention to provide novel means for mounting the stanchion in place, in order that the stanchion will normally remain in proper position, and in order that the stanchion may have limited movements, for the convenience of the animal.

Another object of the present invention is to provide unique means for locking the side members or bars of the stanchion in closed condition, and for spreading the said side bars when the head of the animal is to be introduced between or withdrawn from the side bars of the stanchion.

It is also within the spirit of the present invention to provide a stanchion structure which will be comparatively simple, compact, light and inexpensive in structure, and which will be convenient, serviceable, practical and efficient in its use.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention has been illustrated in its preferred embodiments in the accompanying drawing, wherein:—

Figure 4:
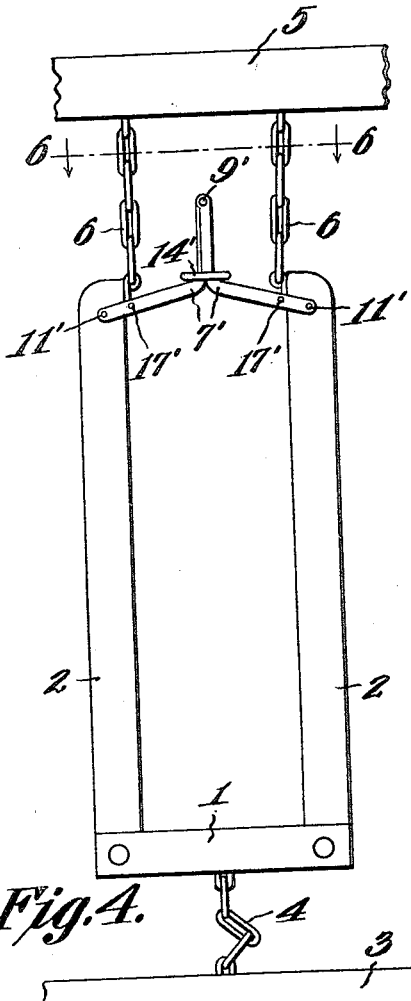
Figure 5:
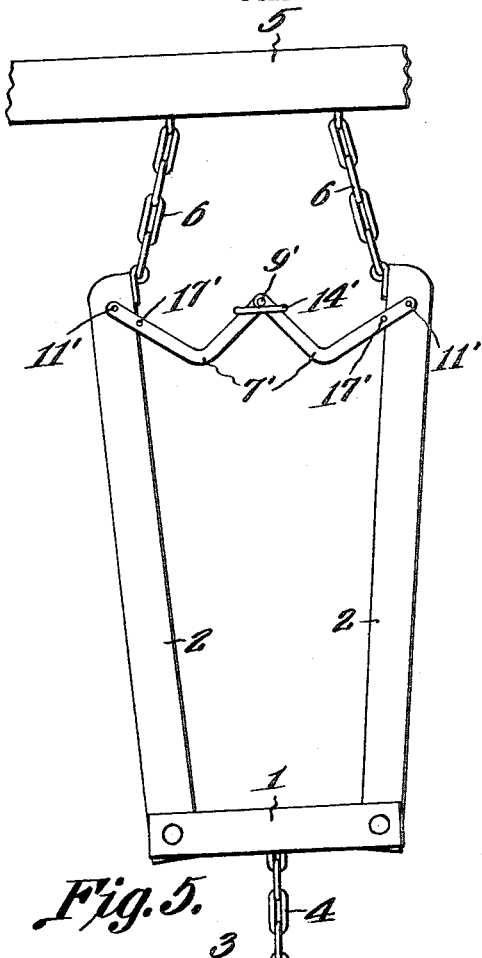
Figure 6:
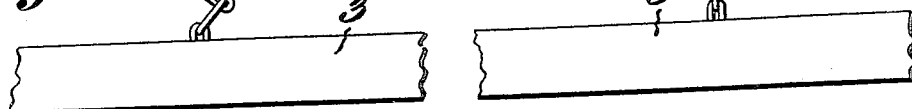

Figure 1 is a front view of one form of the improved stanchion structure in closed position. Fig. 2 is a similar view, with the side bars of the stanchion separated or spread apart. Fig. 3 is an enlarged sectional view, taken on the line 3—3 of Fig. 1. Fig. 4 is a view similar to Fig. 1 of another form. Fig. 5 is a view similar to Fig. 2, of the structure illustrated in Fig. 4. Fig. 6 is a sectional view, taken on the line 6—6 of Fig. 4.

The stanchion proper, embodies a bottom bar 1, and side bars 2, having their lower ends pivoted to the bottom bar 1, as is common in prevailing stanchion structures. In carrying out the present invention, the stanchion is mounted in place, as presently described. The bottom bar 1, is flexibly or loosely connected to the floor or lower beam 3 by a chain or flexible element 4, while the upper or free ends of the side bars 2 are connected to an upper beam or superstructure 5 by means of chains or elements 6 connected to the upper ends of the side bars 2 and to the beam 5. Thus, a pair of suspending chains or flexible elements 6 are provided for the side bars 2 of the stanchion, whereby the said bars may be supported or suspended in an effective manner, and will normally tend to swing together, although the chains 6 will permit the side bars to be spread or swung apart as seen in Fig. 2. The chains or bars 6, will enable the stanchion to swing or move sufficiently, for the convenience of the animal when shackled or locked to the stanchion. The chains 6 also serve to hold the stanchion in alinement with the companion or fellow stanchions, when the stanchion is idle, which is highly desirable.

The mechanism for locking the stanchion in closed position, and for spreading the side bars of the stanchion, embodies a pair of sectoral plates 7 having overlapping ears 8 at certain ends of their curved edges, the ears being pivoted together by a rivet or other pivot member 9. The plates 7 are provided at the other or remote ends of their curved edges with ears 10 overlapping and pivoted to the upper ends of the side bars 2 of the stanchion by means of rivets or other pivot members 11, whereby the plates 7 serve as toggle links connecting the free or upper ends of the stanchion bars 2. Thus, when the plates 7 are sung upwardly, the adjoining edges 12 are engaged to abut or swing together as seen in Fig. 1, the pivotal connection of the two plates being swung upwardly for drawing the side bars 2 of the stanchion to closed position. When the plates 7 are swung downwardly, to bring the pivot 9 in alinement with the pivots 11, or into or beyond dead center, the stanchion bars 2 will be separated or swung apart, as seen in Fig. 2, to thereby open the stanchion.

It is desirable to connect the lower ends of the suspending chains 6 to the curved edges of the plates 7 adjoining the pivots 11, the chains 6 thus being connected indirectly to the upper ends of the side bars 2, this arrangement enabling the side bars 2 to swing open more readily, as suggested in Fig. 2, inasmuch as the plates 7 in swinging downwardly, will cause those portions 13 to which the chains 6 are attached to swing upwardly, thus compensating for the outward movement of the side bars 2 when swung apart.

When the plates 7 are swung upwardly, to swing the side bars 2 to closed position, the weight of the bars 1 and 2 will serve to hold the plates or links 7 in raised position, and when the plates or links 7 are swung downwardly, as seen in Fig. 2, the weight thereof, will spread the side bars 2 of the stanchion, and will hold the said bars in spread or open condition, the weight of the bars 1 and 2 of the stanchion also assisting, due to the fact that the chains 6 are connected to the plates 7 outside of the pivots 11, in order that the weight of the said bars being transmitted to the plates 7 through the medium of the pivots 11, will cause the inner portions 8 of the plates 7 to be swung downwardly.

The plates or links 7 are provided with a locking device for assisting in holding the stanchion in closed position, and for limiting the opening or spreading movement of the side bars 2. To this end, a latch bar 14 is pivoted, intermediate its ends, to one of the plates 7 adjoining the edge 12 thereof, by means of a rivet or pivot pin 15, and one end portion of the latch bar 14 overlaps the other plate 7, and is provided with a slot 16 engaging a pin 17 carried by the second mentioned plate 7 adjoining its straight edge 12. The latch bar 14 is applied to the outer faces of the plates 7, in order that the latch bar may not interfere with the side bars 2 of the stanchion. The slot 16 is of such a length, that its outer end engages the pin 17 when the plates 7 are swung downwardly, to limit the downward movement of the said plates and to thereby limit the spreading or opening movement of the side bars 2. The latch bar 14 is provided at one end with an upstanding hook or catch 18 which is engageable with a pin 19 carried by that plate 7 having the pivot 15, while the other end of the latch bar 14 is provided with a depending hook or catch 20 adapted to spring or snap over a pin or lug 21 carried by the other plate 7, when the plates 7 are swung upwardly or raised. Thus, when the plates 7 are swung upwardly, as seen in Fig. 1, the hook or catch 18 is adapted to engage the lug or pin 19 as seen in Fig. 1, and the hook or catch 20 at the other end of the latch bar is arranged to snap or spring over the lug or pin 21, to thereby assist in holding the plates 7 in raised position. It is to be noted that the latch bar 14 is pivotally connected to one plate 7, and is slidably connected to the other, whereby the above results will follow.

The present invention is employed in the same capacity, as an ordinary cattle stanchion, which is very familiar in the art, and needs no lengthy explanation. Supposing the stanchion to be in closed position, as seen in Fig. 1, to open the stanchion, it is merely necessary to slightly spread the side bars 2, which will cause the latch bar 14 to release the lug or pin 21, whereby the plates 7 will swing downwardly freely, as seen in Fig. 2, to open the stanchion, whereby the head of the animal may be readily passed through or withdrawn from between the side bars 2, as usual. To lock or close the stanchion, the plates 7 are raised, and as soon as the pivot 9 is raised slightly from the position seen in Fig. 2, the weight of the stanchion will cause the plates 7 to come together as seen in Fig. 1, the latch bar 4 engaging the pins or lugs 19 and 21 to assist in holding the stanchion in closed position.

The other form of locking device illustrated in Figs. 4, 5 and 6, embodies two pairs of angular toggle links 7' having their adjacent ends pivoted together, as at 9', and having their remote ends pivoted to the opposite faces of the side bars 2, adjacent the upper or free ends of the said side bars. In this form, the upper chains or flexible elements 6 are attached to the upper or free ends of the side bars 2, preferably at the inner edges of the said bars, the lower chain 4 being normally slackened, to allow the lower chain 4 to compensate for the spreading or separation of the stanchion bars 2. The angular toggle links 7' are so arranged, that when the stanchion bars 2 are swung to normal or closed position, as seen in Fig. 4, the adjacent arms of the links 7' will project upwardly and will swing together, a locking or confining ring 14' being disposed upon the adjacent arms of the toggle links to normally lock them against separation, and to thereby hold the stanchion bars 2 in place. The end portions of the pivot member 9' are preferably extended, as seen in Fig. 6, to serve as stops for limiting the upward movement or external removal of the ring 14'. Each pair of toggle links 7' has a cross pin or rivet 17' engaged therethrough, adjacent the edge of the corresponding bar 2, the pins 17' serving as stops to limit the upward and downward movements of the toggle links 7', as will be obvious by reference to Figs. 4 and 5.

In the use of the second form of locking device illustrated in Figs. 4, 5 and 6, when the adjacent ends of the toggle links 7' are raised above their remote ends, to swing the stanchion bars 2 to normal or closed condition, the locking ring 14' will drop down and embrace the adjacent ends of the toggle links and will rest upon the crotch portions of the links, as seen in Fig. 4. By raising the ring 14', the adjacent ends of the toggle links 7' will be free to swing downwardly, whereby the stanchion bars 2 may separate or spread open, as seen in Fig. 5, the pivot and stop element 9', however, preventing the disengagement or removal of the ring 14', in order that when the toggle links are swung upwardly, the ring 14' will drop to lock the toggle links in raised condition.

From the foregoing, taken in connection with the drawings, the salient features of the present invention will be obvious, without further comment, it being noted that objects aimed at have been carried out satisfactorily.

Having thus described the invention, what is claimed as new is:—

1. A stanchion embodying a bottom bar and a pair of side bars having their lower ends pivoted thereto, a flexible element connected to the bottom bar and arranged for attachment to a lower supporting member, a pair of flexible elements connected to the upper ends of the side bars and arranged for attachment to a superstructure, toggle links connecting the upper ends of the side bars, and means carried by the toggle links, for locking them when their adjacent ends are raised above their remote ends and for limiting the downward movement of the adjacent ends of the links.

2. A stanchion including a pair of pivoted side bars, angular toggle links having their adjacent ends pivoted together, and having their remote ends pivoted to the free ends of the side bars, the adjacent arms being adapted to project upwardly and swing together when the side bars are swung toward each other, and a locking ring disposed upon the adjacent arms of the toggle links to hold them against separation when the adjacent arms of the links are raised, the adjacent ends of the toggle links having a stop for limiting the movement of the locking ring when the locking ring is slid upwardly.

In testimony that I claim the foregoing as my own, I have hereto affixed my signature in the presence of two witnesses.

WALTER R. NELSON.

Witnesses:
 Geo. E. Lewis,
 Dana E. Keyes.

Copies of this patent may be obtained for five cents each, by addressing the "Commissioner of Patents, Washington, D. C."